United States Patent [19]

Eyrainer et al.

[11] Patent Number: 5,219,179
[45] Date of Patent: Jun. 15, 1993

[54] INFLATABLE GAS BAG FOR A RESTRAINING SYSTEM IN VEHICLES

[75] Inventors: Heinz Eyrainer, Waldstetten; Andreas Kolb, Schwäbisch Gmünd-Wetzgau, both of Fed. Rep. of Germany

[73] Assignee: TRW Repa GmbH, Alfdorf, Fed. Rep. of Germany

[21] Appl. No.: 822,549

[22] Filed: Jan. 17, 1992

[30] Foreign Application Priority Data

Jan. 17, 1991 [DE] Fed. Rep. of Germany ....... 4101287

[51] Int. Cl.⁵ ............................................. B60R 21/16
[52] U.S. Cl. ................................... 280/739; 280/743; /
[58] Field of Search ............... 280/730, 731, 732, 739, 280/743

[56] References Cited

U.S. PATENT DOCUMENTS

| 4,097,065 | 6/1978 | Okada et al. | 280/739 |
| 5,007,662 | 4/1991 | Abramczyk et al. | 280/739 |

FOREIGN PATENT DOCUMENTS

2542764 7/1977 Fed. Rep. of Germany .
3217464 5/1983 Fed. Rep. of Germany .

Primary Examiner—Kenneth R. Rice
Attorney, Agent, or Firm—Tarolli, Sundheim & Covell

[57] ABSTRACT

An inflatable gas bag for a restraining system in vehicles is provided in its wall with at least one predefined relief opening which remains sealed up to a predetermined internal pressure of the gas bag and is freed only when this internal pressure is exceeded. The gas bag therefore has the desired hardness in the initial phase of the restraining operation and thereafter effects an energy absorption by controlled discharge of the gases through the relief opening.

14 Claims, 6 Drawing Sheets

INFLATABLE GAS BAG FOR A RESTRAINING SYSTEM IN VEHICLES

The invention relates to an inflatable gas bag for a restraining system in vehicles.

As is known, a gas bag in a restraining system for vehicles is inflated by a gas generator within a few milliseconds after a vehicle collision. To permit energy absorption after the vehicle occupant has come into contact with the gas bag the wall of the latter is made from a gas-permeable fabric or provided with discharge openings which permit a controlled discharge from the interior of the gas bag.

The discharge of the gases through the wall or the discharge openings of the gas bag takes place immediately at the start of the restraining operation because then a high pressure obtains in the interior of the gas bag. The invention is based on the knowledge that the physical and kinematic conditions in the restraining operation are optimum only if the occupant encounters at the start of the restraining operation as hard a gas bag as possible because this instant occurs in the period during which the impact-induced upsetting of the vehicle takes place. The upsetting of the vehicle has a damping effect and consequently it is favourable for the restraining operation for the gas bag to be relatively hard at this time. However, when at the end of the vehicle upsetting travel, when the vehicle has come to a standstill or motion reversal by rebounding has occurred, no more damping effect is available by the vehicle upsetting, a further absorption of the kinetic energy of the vehicle occupant is made possible in that from this instant onwards or just before this instant a controlled discharge of the gases outwardly from the gas bag can take place. In this manner the occupant residual energy can be absorbed via the gas bag. For this purpose the impact cushion formed by the gas bag should be soft and energy-absorbent.

The present invention provides a gas bag whereby an increased damping action can be achieved.

According to the invention, the wall of the gas bag has at least one relief opening which is predefined and which up to a predetermined internal pressure of the gas bag remains closed and is freed when said internal pressure is exceeded. The predetermined internal pressure is selected so that a freeing of the release opening or release openings takes place in the course of the restraining operation when the internal pressure in the gas bag increases due to the penetration of the vehicle occupant into the gas bag. By suitable dimensioning of the parameters by which the release of the relief opening is controlled, in dependence upon the particular vehicle type it is possible to ensure that the damping action due to the vehicle upsetting travel is utilized in optimum manner and that only thereafter or with slight overlapping the damping action by energy absorption in the gas bag takes place. Since now the damping provided by the gas bag is also utilized in optimum manner, the total damping action due to the vehicle upsetting and energy absorption in the gas bag can be considerably increased.

Several embodiments of the invention will now be described in detail with reference to the drawings, wherein.

Figure 1:
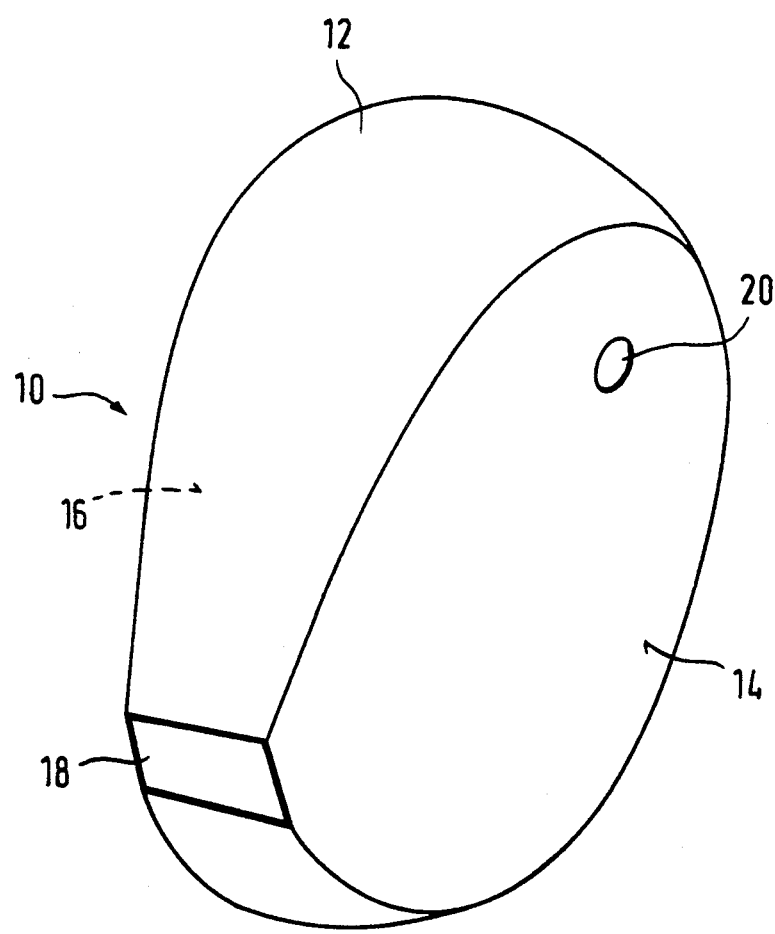
FIG. 1 is a schematic perspective view of a gas bag in the inflated state.

The gas bag denoted generally by 10 in FIG. 1 consists of three wall portions: a jacket portion 12 and two side portions 14, 16. Formed in the jacket portion 12 is a connection opening 18 at the edge of which the gas bag 10 is joined to the housing of a gas generator. In the side portion 14 of the gas bag a relief opening denoted generally by 20 is predefined. Various embodiments of this relief opening 20 will now be described in detail with reference to FIGS. 2 to 11.

Figure 2:
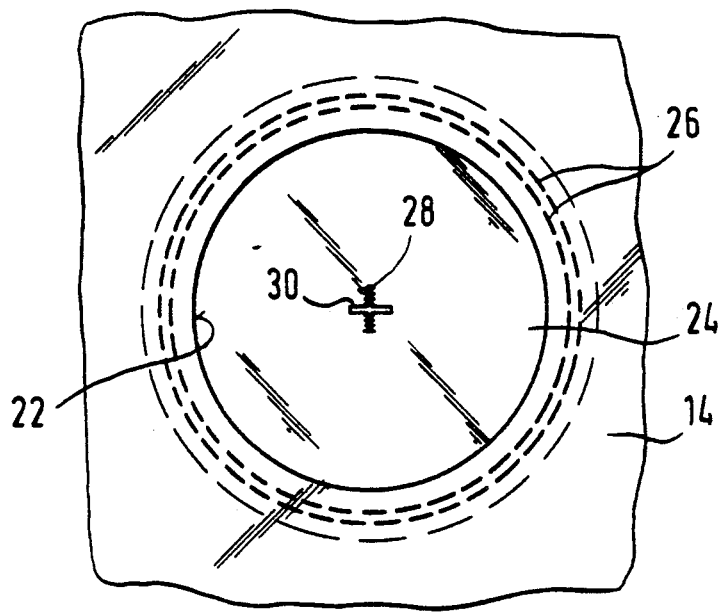
FIGS. 2 to 11 are enlarged partial views of the gas bag representing various embodiments.

In the embodiment according to FIG. 2 a round opening is cut out of the wall of the side portion 14. The cutout 22 thus formed is covered by a material piece 24 which is placed onto the inside of the gas bag and covers the edge of the cutout 22. The material piece 24 is joined at its outer edge to the edge region of the side portion 14 surrounding the cutout 22 by a double seam 26. In the center of the material piece 24 two slots 28, 30 are formed which are arranged crossed and the extent of which is limited to the center zone of the material piece 24. The slots 28, 30 each form the start of a tear line which extends substantially up to the edge of the cutout 22. In the state shown in FIG. 2 only a small amount of gas can escape through the slots 28, 30. Once however a predetermined internal pressure of the gas bag has been reached, the slots 28, 30 are extended in the longitudinal direction because the material piece 24 tears at the ends of the slots 28, 30. The circle defined by the material piece 24 is thus divided by two diametrical orthogonally intersecting tear lines into four sectors which are bent outwardly by the internal pressure of the gas bag and release a relief opening, the size of which corresponds substantially to the area in the interior of the cutout 22. The tearing strength of the material of which the material piece 24 is made is so defined that the relief opening is released at the desired internal pressure, which may vary according to the vehicle type and upsetting behaviour.

Figure 3:
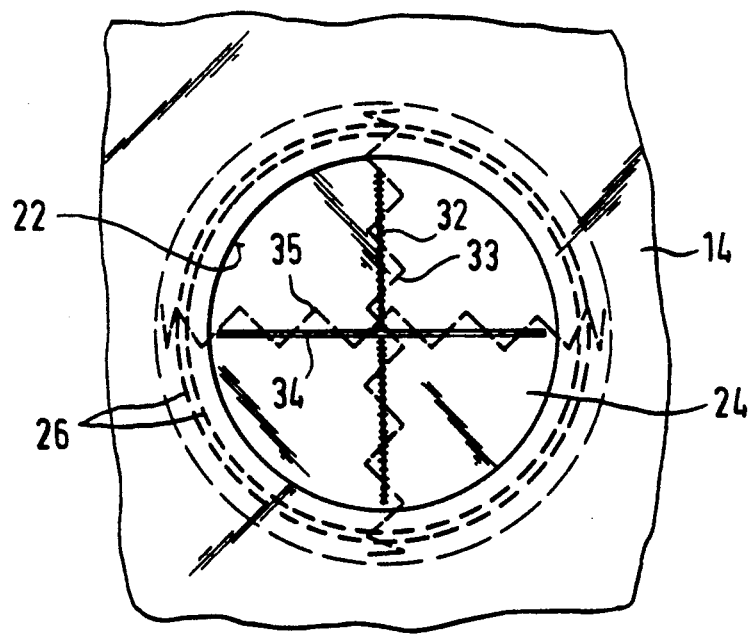

The embodiment according to FIG. 3 differs from that described above in that in the material piece 24 two orthogonally intersecting slots 32, 34 are formed which are each closed by a seam 33, 35 respectively which join together the portions of the material piece 24 disposed on either side of the associated slot. In the state shown in FIG. 3 only a small amount of gas can emerge through the closed slots 32, 34. At a predetermined value of the gas bag internal pressure the seams 33, 35 tear so that the relief opening is released.

Figure 4:
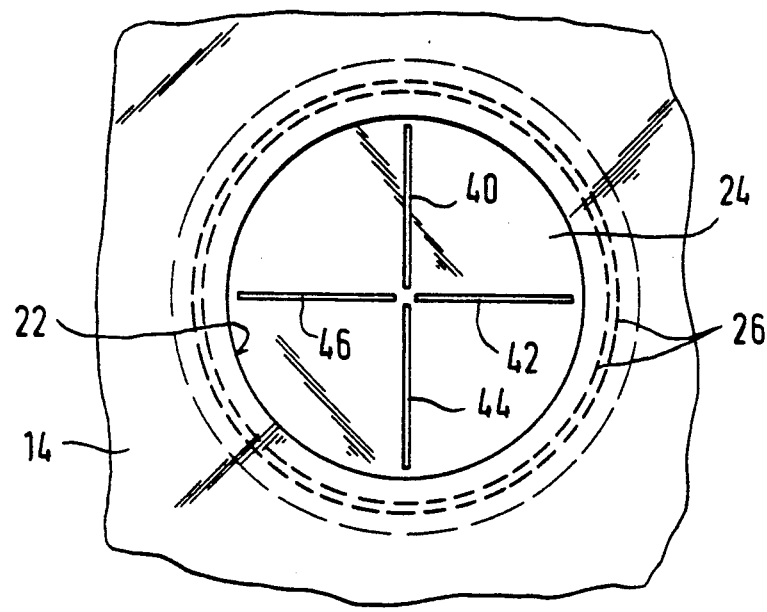

In the embodiment according to FIG. 4 in the material piece 24 four crosswise arranged slots 40, 42, 44, 46 are formed. The inner ends of the slots 40 to 46 do not however extend into the center region of the material piece 24 so that two diametrical intersecting tear lines result which are however interrupted in the center. It is only at the desired internal pressure that the central portion of the material piece 24 between the slots 40 to 46 is also torn.

Figure 5:
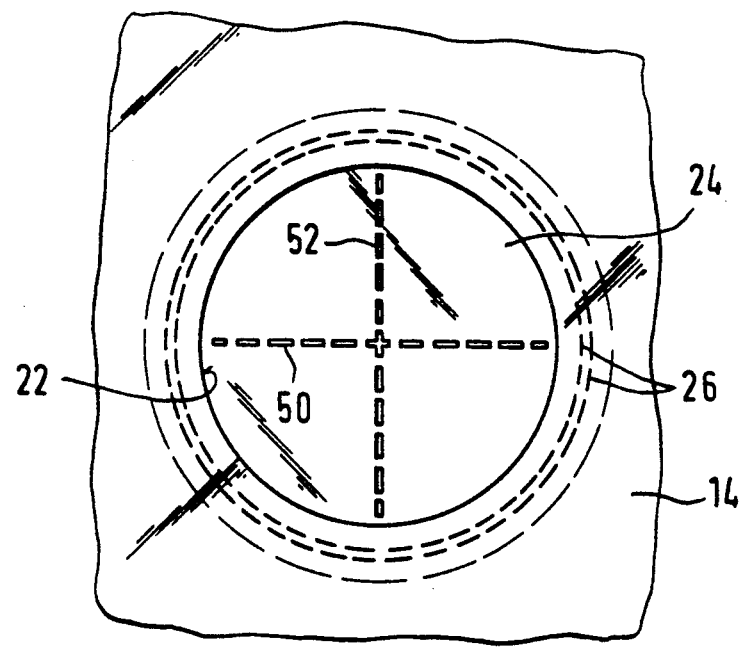

In the embodiment according to FIG. 5 in the material piece 24 two orthogonally intersecting diametrically extending tear lines 50, 52 are formed by consecutive spaced-apart slots. The webs remaining between the individual slots are torn at a predetermined value of the gas bag internal pressure so that the relief opening is released.

Figure 6:
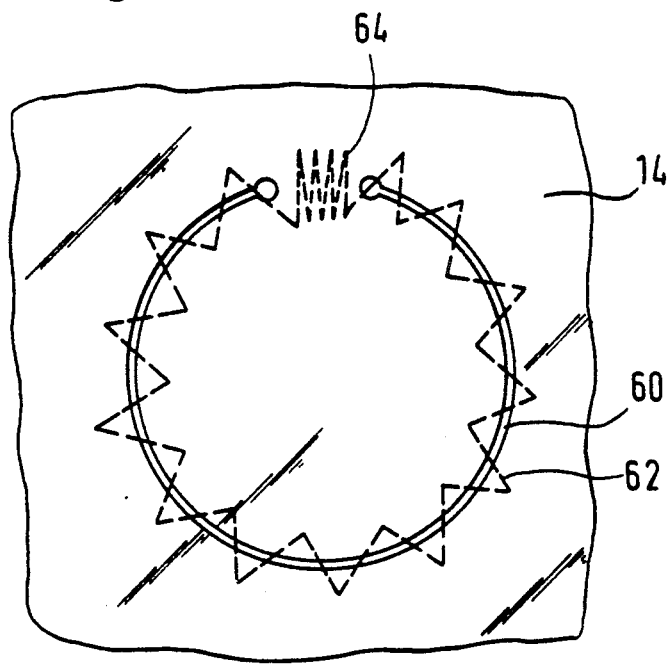

In the embodiment shown in FIG. 6 a partially circular slot 60 is formed in the wall of the side portion 14. The region within the slot 60 forms a flap which is connected to the remaining wall of the side portion 14 by the wall portion disposed between the end points of the slot. The wall portions disposed on either side of the slot 60 are joined together by a seam 62 which extends in zig-zag manner. The wall portion between the ends of the slot 60 is reinforced by a plurality of seam stitches 64 led transversely to the extension direction of the slot 60. The strength of the seam 62 is so dimensioned that at the desired gas bag internal pressure said seam tears and frees the release opening.

In the modification of the embodiment described above shown in FIG. 7 a partially circular tear line 70 is formed by individual slots following each other at intervals. The flap-like portion 72 of the wall of the side portion 14 disposed in the interior of the tear line 70 remains connected to the other wall portion thereof by the webs left between the individual slots. However, at the desired gas bag internal pressure these webs are torn so that the relief opening is released.

Figure 7:
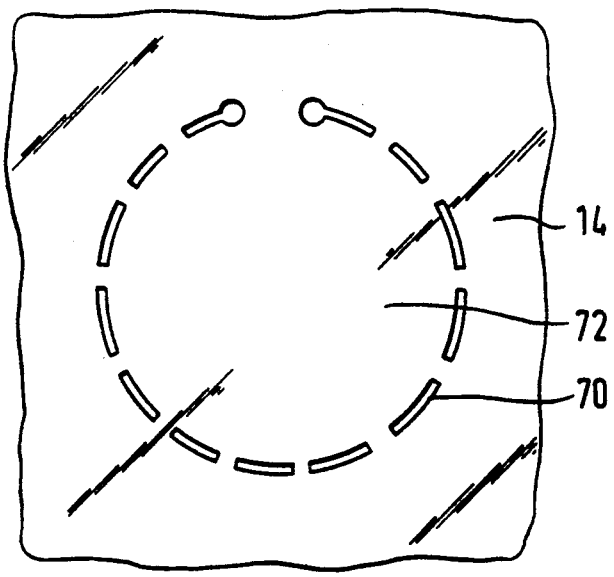
Figure 8:
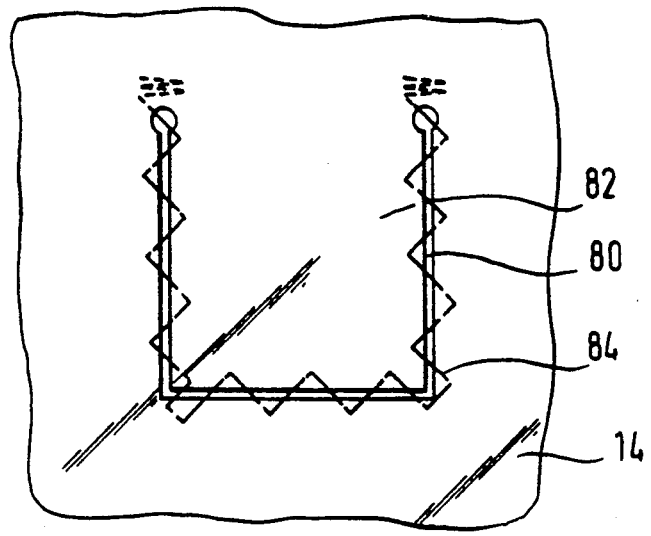
Figure 9:
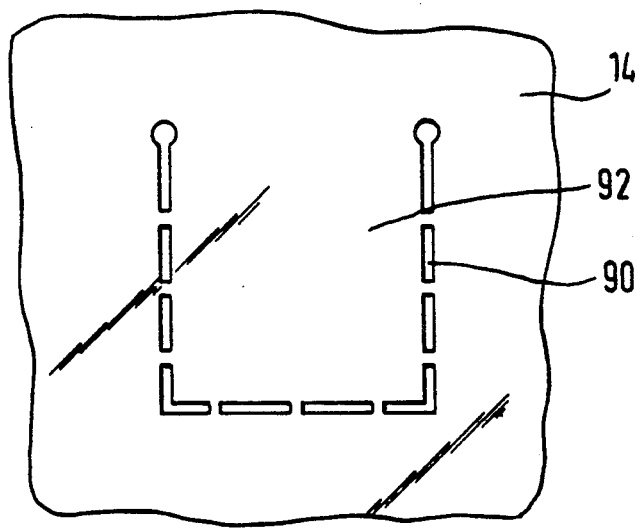

The embodiments according to FIGS. 8 and 9 are based on the same principle as the embodiments described previously according to FIGS. 6 and 7, but the relief opening defined by the slot 80 in FIG. 8 or the tear line 90 in FIG. 9 is not circular but rectangular. Accordingly, the flap-like wall portion 82 disposed in the interior of the slot 80 held together by a seam 84 is also rectangular, as is the flap-like wall portion 92 which is joined to the remaining wall of the side portion 14 by the material webs between the individual slots of the tear line 90.

Figure 10:
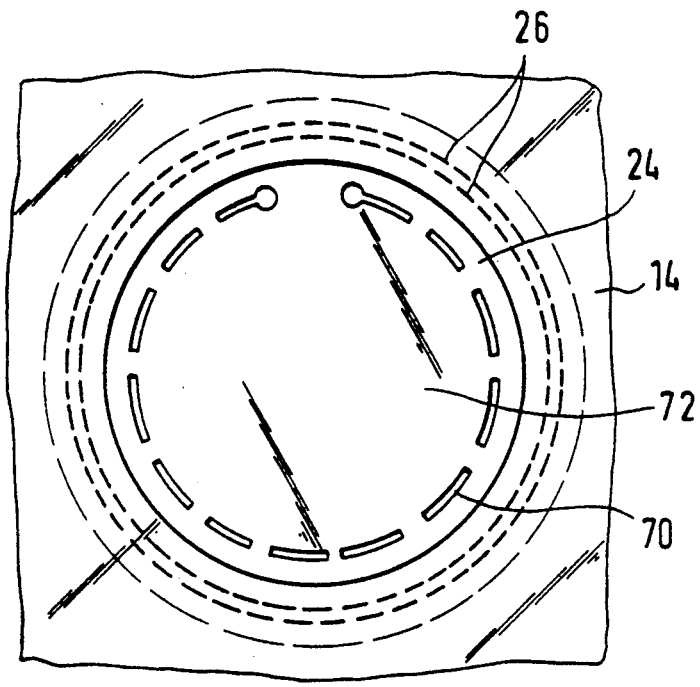
Figure 11:
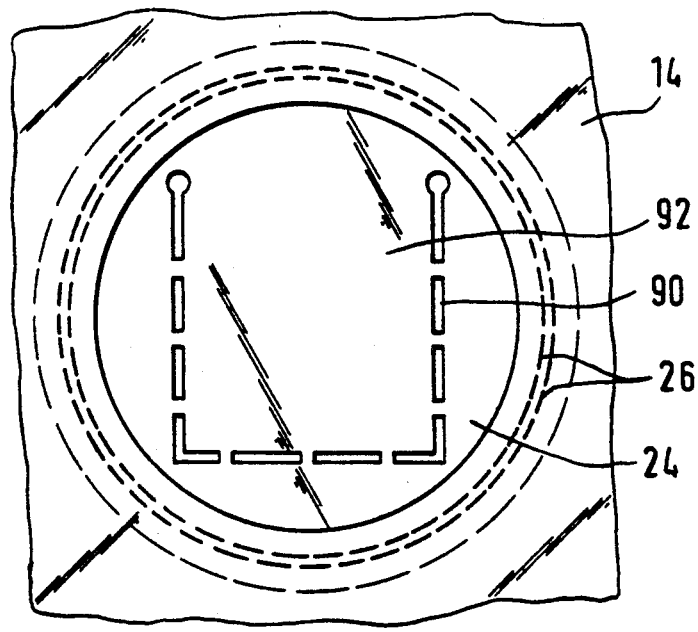

The embodiments according to FIGS. 10 and 11 are comparable to those according to FIGS. 7 and 9 but differ therefrom in that the tear line 70 or 90 is formed in a separate material piece 24 which is placed onto the inside of the gas bag, similar to FIGS. 2 to 5. It has been found that the tear characteristics can thus be utilized in optimum manner independent of the material of the actual gas bag.

Above, several embodiments have been described of in each case a single relief opening. The gas bag 10 (FIG. 1) can be provided with several such relief openings. The number and arrangement of the relief openings depend on the particular use.

We claim:

1. An inflatable gas bag for a restraining system in a vehicle comprising a gas bag wall wherein at least one relief opening is predefined by a cutout in said gas bag wall, and which is closed by a material piece joined by a first seam to said gas bag wall along the edge of said cutout, said material piece having at least one tear line extending across said material piece and said relief opening remaining closed along said tear line up to a predetermined internal pressure of the gas bag and being freed when said internal pressure is exceeded.

2. The gas bag according to claim 1, wherein two tear lines are arranged crosswise in said material piece.

3. The gas bag according to claim 1, wherein said tear line is formed by a slot in said material piece, said slot having adjacent edges joined by a second seam.

4. The gas bag according to claim 2, wherein said crosswise arranged tear lines are formed by slots extending only in the center region of the material piece.

5. The gas bag according to claim 3, wherein said second seam has end points which are reinforced by seam stitches disposed transversely of the longitudinal direction of said second seam.

6. The gas bag according to claim 1, wherein said cutout is generally circular.

7. An inflatable gas bag for a restraining system in a vehicle comprising a gas bag wall wherein at least one relief opening is predefined by at least one tear line, said relief opening remaining closed up to a predetermined internal pressure of the gas bag and being freed when the predetermined internal pressure is exceeded, and said tear line being formed by a plurality of spaced apart slots.

8. The gas bag according to claim 7, wherein said tear line comprises two sets of spaced slots each arranged along one of two lines crossing each other.

9. The gas bag according to claim 7, wherein said relief opening is generally circular.

10. The gas bag according to claim 7, wherein said relief opening is generally rectangular.

11. An inflatable gas bag for a restraining system in a vehicle comprising a gas bag wall wherein at least one relief opening is predefined by at least one tear line along which the material of said gas bag wall is weakened, said relief opening remaining closed up to a predetermined internal pressure of the gas bag and being freed when the predetermined internal pressure is exceeded, and said tear line being formed by a slot in said gas bag wall extending along the periphery of said relief opening to form only one flap in the material of said gas bag wall, said slot having adjacent edges joined by a seam.

12. The gas bag according to claim 11, wherein said seam has end points which are reinforced by seam stitches disposed transversely of the longitudinal direction of said seam.

13. The gas bag according to claim 11, wherein said relief opening is generally circular.

14. The gas bag according to claim 11, wherein said relief opening is generally rectangular.

* * * * *